(12) United States Patent
Pieussergues et al.

(10) Patent No.: US 8,215,118 B2
(45) Date of Patent: Jul. 10, 2012

(54) OPTIMIZING THE ANGULAR POSITIONING OF A TURBINE NOZZLE AT THE OUTLET FROM A TURBOMACHINE COMBUSTION CHAMBER

(75) Inventors: Christophe Pieussergues, Nangis (FR); Denis Jean Maurice Sandelis, Nangis (FR)

(73) Assignee: SNECMA, Paris (FR)

(*) Notice: Subject to any disclaimer, the term of this patent is extended or adjusted under 35 U.S.C. 154(b) by 731 days.

(21) Appl. No.: 12/427,321

(22) Filed: Apr. 21, 2009

(65) Prior Publication Data

US 2009/0266080 A1    Oct. 29, 2009

(30) Foreign Application Priority Data

Apr. 24, 2008 (FR) .................................... 08 02291

(51) Int. Cl.
*F02G 3/00* (2006.01)

(52) U.S. Cl. ........................................... 60/804; 60/740

(58) Field of Classification Search .................... 60/804, 60/740, 746, 752
See application file for complete search history.

(56) References Cited

U.S. PATENT DOCUMENTS

| 3,433,015 | A | 3/1969 | Sneeden |
| 3,608,310 | A | 9/1971 | Vaught |
| 4,733,538 | A | 3/1988 | Vdoviak et al. |
| 6,487,861 | B1 * | 12/2002 | Carita et al. ................. 60/748 |
| 6,554,562 | B2 * | 4/2003 | Dudebout et al. ............. 415/1 |
| 7,739,873 | B2 * | 6/2010 | Venkataramani et al. ..... 60/773 |
| 2003/0002975 | A1 | 1/2003 | Dudebout et al. |

* cited by examiner

*Primary Examiner* — Ehud Gartenberg
*Assistant Examiner* — Vikansha Dwivedi
(74) *Attorney, Agent, or Firm* — Oblon, Spivak, McClelland, Maier & Neustadt, L.L.P.

(57) ABSTRACT

A turbomachine including an annular combustion chamber fitted with fuel injectors and nozzle vanes arranged at the outlet from the chamber, the number of nozzle vanes being an integer multiple of the number of fuel injectors, and the head of each injector being situated angularly half-way between the leading edges of two consecutive nozzle vanes, these leading edges being in alignment with primary air holes and/or with dilution air holes.

4 Claims, 3 Drawing Sheets

OPTIMIZING THE ANGULAR POSITIONING OF A TURBINE NOZZLE AT THE OUTLET FROM A TURBOMACHINE COMBUSTION CHAMBER

FIELD OF THE INVENTION

The present invention relates to a turbomachine, such as an airplane turbojet or turboprop, the turbomachine being of the type including an annular combustion chamber and a turbine nozzle arrange at the outlet from the combustion chamber.

BACKGROUND OF THE INVENTION

A turbomachine combustion chamber comprises two coaxial walls forming bodies of revolution extending one inside the other and connected together at their upstream ends by an annular chamber end wall fitted with means for injecting fuel into the chamber. These injector means comprise an annular row of fuel injectors that extend substantially radially relative to the axis of the chamber and that have heads at their radially inner ends that are in alignment with orifices through the chamber end wall.

The turbine inlet nozzle comprises an annular wall of stationary vanes extending substantially radially at the outlet from the combustion chamber.

In the present art, the number of nozzle vanes is generally determined independently from the number of fuel injectors of the chamber, and their angular positions relative to the injectors and the primary air and dilution air holes formed through the chamber walls around the axis thereof are arbitrary. This leads to large temperature non-uniformities between the vanes of the nozzle. Vanes that are randomly disposed relative to the injectors and to the primary air and dilution air holes are not all exposed to the same thermal environment, since the temperature profile of the combustion gas at the outlet from the chamber varies around the perimeter of the chamber. These temperature non-uniformities can shorten the lifetime of the nozzle and can reduce the performance of the turbomachine.

OBJECT AND SUMMARY OF THE INVENTION

A particular object of the invention is to provide a solution to these problems that is simple, effective, and inexpensive.

To this end, the invention provides a turbomachine including an annular combustion chamber comprising inner and outer coaxial walls connected together at their upstream ends by an annular chamber end wall, a nozzle comprising an annular row of stationary vanes situated at the outlet from the chamber, and an annular row of fuel injectors having heads in alignment with orifices in the chamber end wall, the number of nozzle vanes being equal to k times the number of injectors, where k is an integer, wherein the head of each injector lies in a plane that contains the axis of the turbomachine and that is half-way between the leading edges of two consecutive nozzle vanes, and that intersects at least one dilution air inlet orifice passing through the inner wall, and/or through at least one dilution air inlet orifice passing through the outer wall, primary air inlet orifices being formed through the chamber walls upstream from the dilution orifices and on either side of the planes passing via the injector heads.

Unlike the prior art, the number of nozzle vanes situated at the outlet from the chamber is determined as a function of the number of injectors feeding said chamber and may be equal to the number of fuel injectors or equal to twice the number of fuel injectors, and the vanes of the nozzle are all in the same position relative to the fuel injectors and to the primary air inlet and dilution air inlet orifices, thus making it possible to expose all of the vanes to the same temperature conditions that are imposed in particular by the combustion of fuel in the chamber. The nozzle vanes are thus all subjected to substantially the same thermal stresses in operation, thereby lengthening the lifetime of the nozzle and increasing the performance of the turbomachine.

The head of each injector lies in a plane that contains the axis of the turbomachine and that passes via at least one air inlet orifice passing through the inner wall and/or at least one air inlet orifice passing through the outer wall, the orifice(s) contained in each plane being identical to the orifices contained in the other planes, and being disposed in the same manner. Each plane intersects a dilution air inlet orifice in the outer wall and/or a dilution air inlet orifice through the inner wall.

The temperature environment at the outlet from the chamber is a function of the combustion of sheets of fuel sprayed by the injectors into the chamber, and also as a function of the ventilation of the chamber walls by the air passing through the orifices in said walls. The vanes of the nozzle are thus all in the same temperature environment and are thus indeed subjected to the same thermal stresses in operation.

In a variant, the leading edge of each nozzle vane may lie in a plane containing the axis of the turbomachine and intersecting at least one air inlet orifice passing through the inner wall and/or at least one air inlet orifice passing through the outer wall, the orifice(s) contained in each plane being identical to the orifices contained in the other planes, and being disposed in the same manner. By way of example, each plane intersects a dilution air inlet orifice in the outer wall and/or via a dilution air inlet orifice through the inner wall, and is substantially half-way between the axes of the heads of two consecutive injectors, each plane being situated at one injector half-pitch from the head of an injector. In a variant, each plane may intersect a dilution air inlet orifice and a primary air inlet orifice through the chamber wall and/or a dilution air inlet orifice and a primary air inlet orifice through the inner wall, and is substantially at one injector quarter-pitch from the head of an injector. In all of the above configurations, the vanes are all exposed to the same temperature conditions in operation.

BRIEF DESCRIPTION OF THE DRAWINGS

The invention can be better understood and other characteristics, details, and advantages of the present invention appear more clearly on reading the following description made by way of non-limiting example with reference to the accompanying drawings, in which.

MORE DETAILED DESCRIPTION

Figure 1:
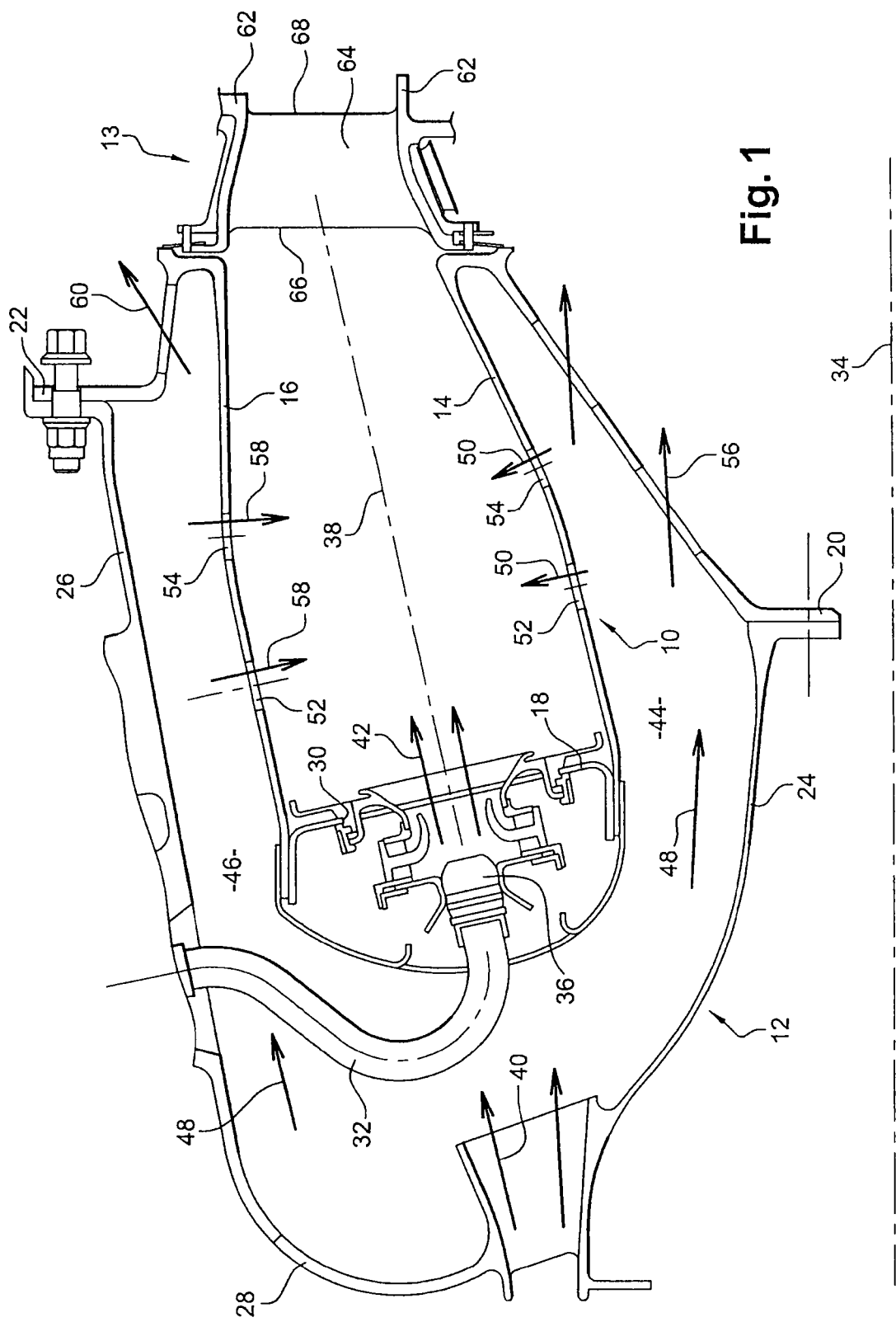
FIG. 1 is a diagrammatic half-view in axial section of a combustion chamber and a high pressure turbine nozzle of a turbomachine.

FIG. 1 shows a turbomachine such as an airplane turbojet or turboprop, the turbomachine having an annular combustion chamber 10 arranged between a diffuser 12 and an inlet nozzle 13 of a high-pressure turbine.

The chamber 10 has inner and outer walls 14 and 16 in the form of bodies of revolution that are connected together, upstream, by an annular chamber end wall 18 and that are connected downstream, via inner and outer annular flanges 20 and 22, respectively to an inner frustoconical web 24 of the nozzle and to a downstream end of an outer casing 26 of the chamber, the upstream end of the casing 26 being connected to an outer frustoconical web 28 of the nozzle.

The annular chamber end wall 18 has orifices 30 through which there pass both air coming from the diffuser 12 and fuel delivered by injectors 32 that are fastened to the outer casing 26 and that are regularly distributed around a circumference about the longitudinal axis 34 of the turbomachine. Each injector 32 has a fuel injector head 36 mounted in an orifice 30 in the annular wall 18, this head 36 of axis 38 being in alignment with the orifice 30.

A portion of the air flow delivered by the compressor and leaving the diffuser 12 (arrows 40) passes through the orifices 30 and feeds the combustion chamber 10 (arrows 42), while the remainder of the air flow feeds inner and outer annular channels 44 and 46 bypassing the combustion chamber 10 (arrows 48).

The inner channel 44 is formed between the inner web 24 of the diffuser 12 and the inner wall 14 of the chamber 10, and the air passing along this channel is shared between a flow 50 that penetrates into the chamber 10 via orifices 52, 54 through the inner wall 14, and a flow 56 that passes through holes in the inner flange 20 of the chamber to go and cool components (not shown) situated downstream from the chamber.

The outer channel 46 is formed between the outer casing 26 and the outer wall 16 of the chamber, and the air passing along this channel is shared between a flow 58 that penetrates into the chamber 10 via orifices 52, 54 through the outer wall 16, and a flow 60 that passes through holes in the outer flange 22 to go and cool components downstream.

The orifices 52, referred to as primary air inlet orifices, are distributed regularly on circumferences of the inner and outer walls 14 and 16 respectively, being centered on the axis 34, and the orifices 54, referred to as dilution air inlet orifices, are regularly distributed on circumferences of the inner and outer walls 14 and 16 respectively, being centered on the axis 34 and downstream from the orifices 52.

The nozzle 13 has two walls 62 in the form of bodies of revolution that are substantially cylindrical and that have radial stationary vanes 64 extending between them. The walls 62 of the nozzle extend axially to extend the walls 14 and 16 of the chamber, downstream therefrom, and they are sectorized, i.e. they are made up of a plurality of circumferentially-oriented platforms that are disposed end to end circumferentially.

The vanes 64 of the nozzle are regularly distributed around the axis 34 of the turbomachine. In known manner, each of these vanes 64 has an upstream leading edge 66 and a downstream trailing edge 68 relative to the flow direction of the combustion gas leaving the chamber 10.

According to the invention, the number of nozzle vanes 64 is an integer multiple of the number of fuel injectors 32 of the chamber, and the vanes 64 are positioned angularly around the axis 34, facing the injectors and the primary air and dilution air orifices, in such a manner as to be exposed to the same thermal conditions in operation.

Figure 2:
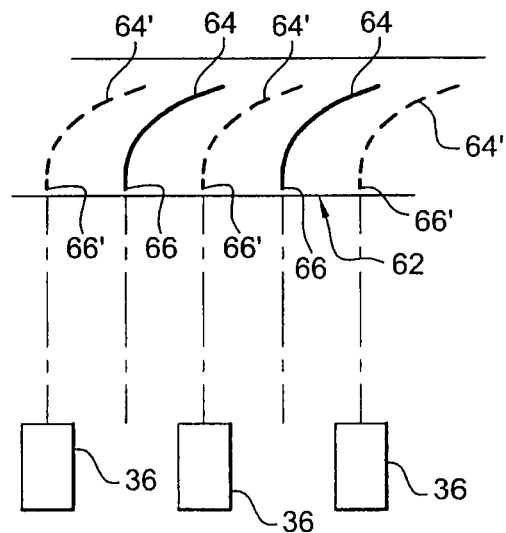
FIG. 2 is a highly diagrammatic view showing the number of nozzle vanes relative to the number of fuel injectors in a turbomachine.
Figure 3:
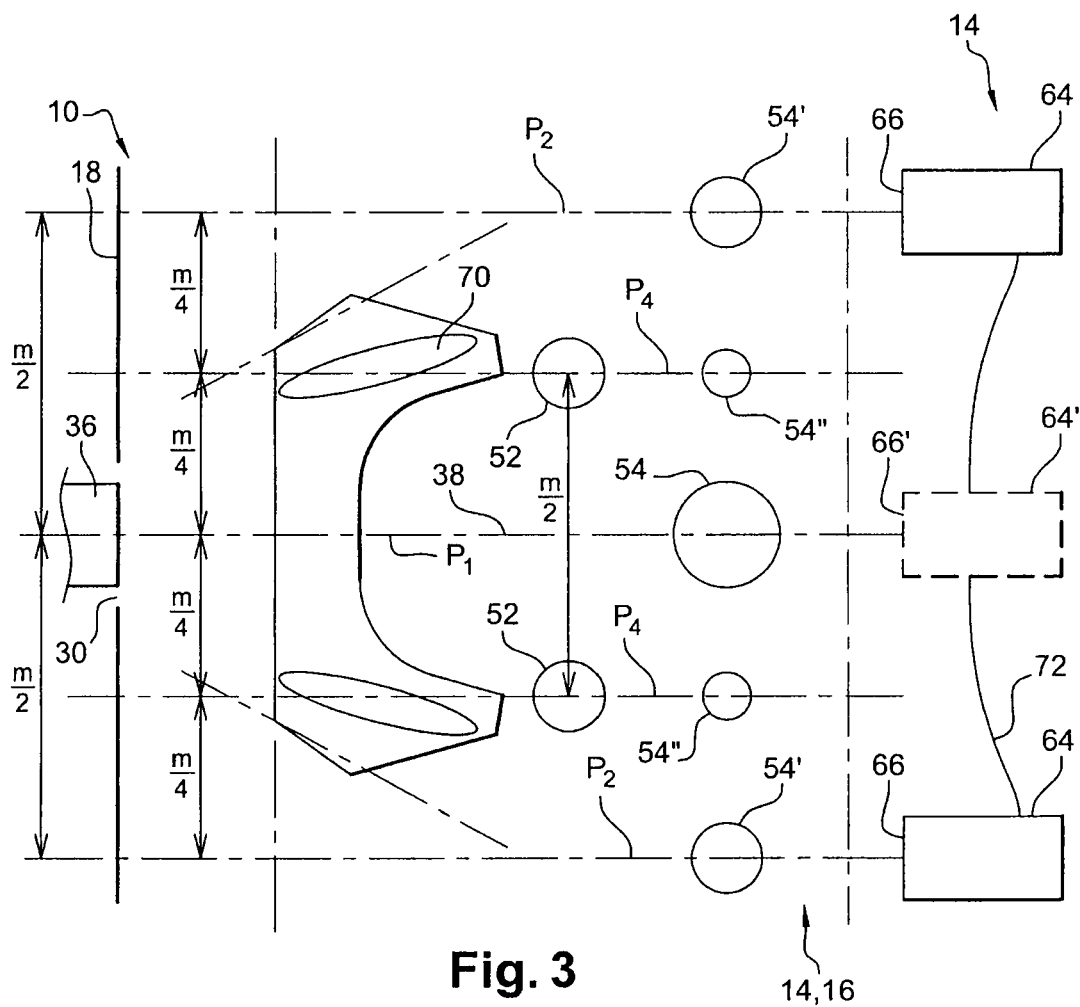
FIG. 3 is a highly diagrammatic view showing the position of the nozzle vanes relative to the fuel injectors in the FIG. 2 configuration.

In the embodiments shown in FIGS. 2 and 3, the number of vanes 64 of the nozzle is the same as the number of fuel injectors (k=1).

In FIG. 2, the vanes 64, 64' are represented by curved thick lines that are continuous in a first embodiment and discontinuous in a variant embodiment. The heads 36 of the injectors 32 are represented by rectangles.

In the first embodiment, the leading edges 66 of the vanes 64 of the nozzle are staggered relative to the heads 36 of the injectors 32. In a variant, the leading edges 66' of the vanes 64' are axially aligned with the heads 36 of the injectors.

Both of these two embodiments are shown in FIG. 3, which shows a portion of the combustion chamber and of the nozzle of a turbomachine of the invention, as seen from above.

A single injector head 36 is shown in the drawing, this head 36 being coaxially aligned in a corresponding orifice 30 in the chamber end wall 18.

Each head 36 sprays a sheet of fuel 70 into the chamber 10, which sheet is substantially frustoconical in shape, the truncated cone extending along the axis 38 of the head 36 and flaring downstream.

If the angular pitch between the fuel injectors 36 is written m, then m/2 designates one injector half-pitch, and m/4 designates one injector quarter-pitch.

The walls 14 and 16 of the chamber, forming bodies of revolution, included primary air inlet orifices 52 and dilution air inlet orifices 54, 54', and 54".

The primary air inlet orifices 52 are regularly distributed around the axis of the turbomachine and they are at one injector half-pitch (m/2) relative to one another. The dilution air inlet orifices 54, 54', 54" are regularly distributed around the same axis and they are at one injector quarter-pitch (m/4) relative to one another.

For each fuel injector 32, a plane P1 is defined that contains the axis of the turbomachine and the head 36 of the injector.

In the example shown, this plane P1 intersects a dilution air inlet orifice 54 of relatively large diameter. The primary air inlet orifices 52 are situated on either side of the plane P1 at one injector quarter-pitch therefrom. The other dilution air inlet orifices 54' and 54" are situated on either side of the plane P1 at one injector half-pitch and one injector quarter-pitch respectively from said plane.

The air inlet orifices 52, 54, 54', 54" that serve to ventilate the walls 14, 16 of the chamber have an influence on the temperature profile 72 of the combustion gas leaving the chamber. Naturally, the greater the diameter of the orifices, the greater the flow of ventilation air passing through said orifices and so the greater the extent to which the temperature of the combustion gas leaving the chamber is decreased. The combustion gas has a temperature slightly lower in the planes P1 containing the injector heads 36 and intersecting the largest-diameter orifices 54. This temperature increases on going away from the plane P1 and reaches a maximum at about one half-pitch on either side of the plane, axially in alignment with the smaller-diameter orifices 54'.

In the first embodiment, each plane P1 is substantially half-way between the leading edges 66 of two consecutive vanes 64 of the nozzle. Each leading edge 66 of the vanes 64 lies in another plane P2 that contains the axis of the turbomachine and intersects the above-mentioned air inlet orifices 54', being situated at one injector half-pitch from the plane P1. The leading edges 66 of the vanes 64 are thus all situated in zones where the combustion gas is at its hottest.

In the variant embodiment, each plane P1 passes via the leading edge 66' of a nozzle vane 64'. The leading edges 66' of the vanes 64' are thus all situated in zones where the combustion gases are the coolest.

Figure 4:
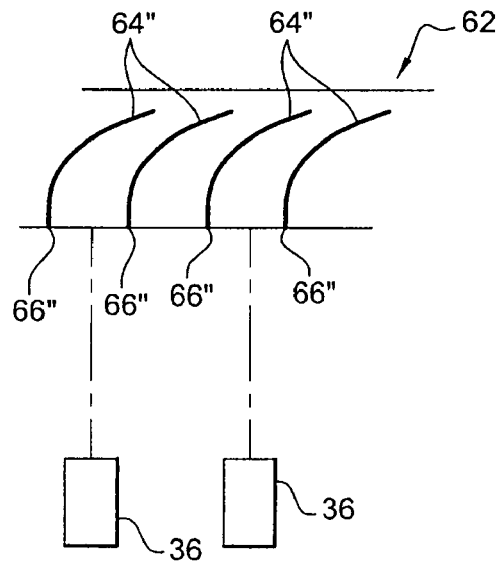
FIG. 4 is a highly diagrammatic view showing the number of nozzle vanes relative to the number of fuel injectors in a variant embodiment of a turbomachine.
Figure 5:
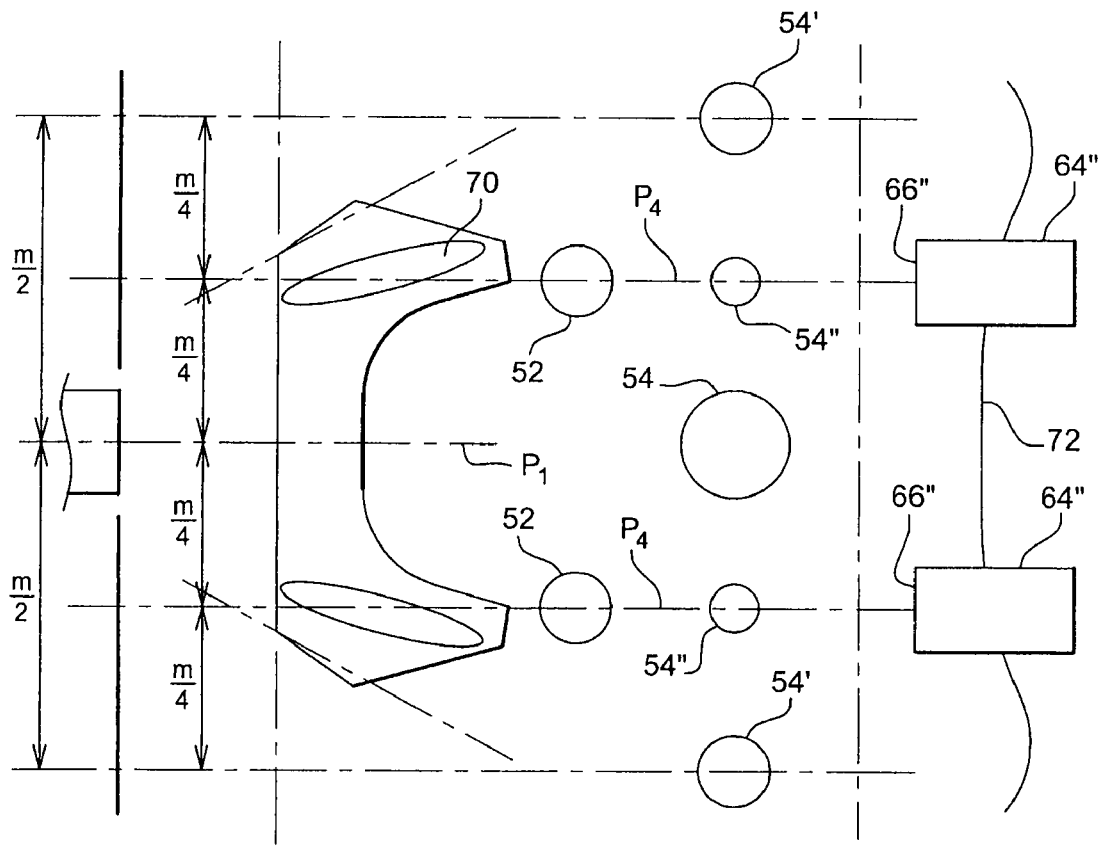
FIG. 5 is a highly diagrammatic view showing the position of the nozzle vanes relative to the fuel injectors in the FIG. 4 configuration.

In another embodiment shown in FIGS. 4 and 5, the number of nozzle vanes 64" is twice the number of fuel injectors 32 (k=2). Each plane P1 intersecting the head 36 of an injector is substantially half-way between the leading edges 66" of two consecutive vanes 64". Each leading edge 66" lies in a plane P4 that is situated at one injector quarter-pitch from the plane P1. The dispositions of the primary air inlet orifices 52 and of the dilution air inlet orifices 54, 54', and 54" are the same as in FIG. 3. The leading edges 66" of the vanes are thus all positioned in a zone where the combustion gas has a medium temperature, neither too hot nor too cold.

What is claimed is:

1. A turbomachine including an annular combustion chamber comprising inner and outer coaxial walls connected together at their upstream ends by an annular chamber end wall, a nozzle comprising an annular row of stationary vanes situated at the outlet from the chamber, and an annular row of fuel injectors having heads in alignment with orifices in the chamber end wall, the number of nozzle vanes being equal to k times the number of injectors, where k is an integer, wherein the head of each injector lies in a plane that contains the axis of the turbomachine and that is half-way between the leading edges of two consecutive nozzle vanes, and that intersects at least one dilution air inlet orifice passing through the inner wall, and/or through at least one dilution air inlet orifice passing through the outer wall, primary air inlet orifices being formed through the chamber walls upstream from the dilution orifices and on either side of the planes passing via the injector heads.

2. A turbomachine according to claim 1, wherein the leading edge of each nozzle vane lies in a plane that contains the axis of the turbomachine and that intersects at least one primary air inlet orifice or at least one dilution air inlet orifice passing through a coaxial wall of the combustion chamber.

3. A turbomachine according to claim 2, wherein each plane containing a leading edge of a vane intersects a dilution air inlet orifice in the outer wall and/or via a dilution air inlet orifice through the inner wall, and is situated at one injector half-pitch from the head of an injector.

4. A turbomachine according to claim 2, wherein each plane containing a leading edge of a vane intersects a dilution air inlet orifice and a primary air inlet orifice through a coaxial wall of the combustion chamber, and is situated at one injector quarter-pitch from the head of an injector.

* * * * *